United States Patent
Liu

(10) Patent No.: US 10,018,772 B2
(45) Date of Patent: Jul. 10, 2018

(54) POSITION-LIMITING STRUCTURE FOR BACKLIGHT MODULE, BACKLIGHT MODULE AND DISPLAY DEVICE

(71) Applicants: BOE TECHNOLOGY GROUP CO., LTD., Beijing (CN); HEFEI BOE DISPLAY LIGHT CO., LTD., Hefei, Anhui (CN)

(72) Inventor: Xiang Liu, Beijing (CN)

(73) Assignees: BOE TECHNOLOGY GROUP CO., LTD., Beijing (CN); HEFEI BOE DISPLAY LIGHT CO., LTD., Hefei, Anhui (CN)

(*) Notice: Subject to any disclaimer, the term of this patent is extended or adjusted under 35 U.S.C. 154(b) by 33 days.

(21) Appl. No.: 15/108,008

(22) PCT Filed: Jan. 5, 2016

(86) PCT No.: PCT/CN2016/070099
§ 371 (c)(1),
(2) Date: Jun. 24, 2016

(87) PCT Pub. No.: WO2017/024753
PCT Pub. Date: Feb. 16, 2017

(65) Prior Publication Data
US 2017/0199321 A1    Jul. 13, 2017

(30) Foreign Application Priority Data
Aug. 11, 2015  (CN) .................... 2015 2 0601742 U

(51) Int. Cl.
*F21V 7/04*     (2006.01)
*F21V 8/00*     (2006.01)

(52) U.S. Cl.
CPC .................................. *G02B 6/0088* (2013.01)

(58) Field of Classification Search
CPC ............. G02B 6/0088; G02F 1/133308; G02F 2201/46
See application file for complete search history.

(56) References Cited

U.S. PATENT DOCUMENTS

2011/0199787 A1* 8/2011 Kim .................... G02B 6/0023
                                                        362/612
2012/0182761 A1* 7/2012 Ikuta ................... G02B 6/0078
                                                        362/606
(Continued)

FOREIGN PATENT DOCUMENTS

CN         202266999 U      6/2012
CN         102767753 A     11/2012
(Continued)

OTHER PUBLICATIONS

International Search Report dated May 3, 2016 issued in corresponding International Application No. PCT/CN2016/070099 along with an English translation Written Opinion of the International Searching Authority.

*Primary Examiner* — Evan Dzierzynski
(74) *Attorney, Agent, or Firm* — Nath, Goldberg & Meyer; Joshua B. Goldberg

(57) ABSTRACT

The invention provides a position-limiting structure for a backlight module, a backlight module and a display device, belongs to the field of display technology, and can solve the problem in the prior art that an alignment error occurs in the light-guiding plate due to the fact that the double-sided adhesive tape is adhered to fix the backplane and the light-guiding plate. The position-limiting structure for a backlight module of the invention is made of an elastic material, and is configured to be connected to the backplane; the position-limiting structure includes the position-limiting part, which is arranged outside an edge at least one non (Continued)

light-incoming side of the light-guiding plate and is configured to fix the light-guiding plate to the backplane.

16 Claims, 2 Drawing Sheets

(56) References Cited

U.S. PATENT DOCUMENTS

2013/0342783 A1* 12/2013 Kuo ................... G02B 6/0088
  349/58
2014/0104538 A1* 4/2014 Park ................. G02F 1/133608
  349/60

FOREIGN PATENT DOCUMENTS

| | | |
|---|---|---|
| CN | 104133308 A | 11/2014 |
| CN | 104613374 A | 5/2015 |
| CN | 204853358 U | 12/2015 |
| JP | 2009277641 A | 11/2009 |

* cited by examiner

POSITION-LIMITING STRUCTURE FOR BACKLIGHT MODULE, BACKLIGHT MODULE AND DISPLAY DEVICE

This is a National Phase application filed under 35 U.S.C. 371 as a national stage of PCT/CN2016/070099 filed on Jan. 5, 2016, an application claiming the benefit of Chinese Application No. 201520601742.X filed on Aug. 11, 2015, the content of each of which is hereby incorporated by reference in its entirety.

FIELD OF THE INVENTION

The invention belongs to the field of display technology, and particularly relates to a position-limiting structure for a backlight module, a backlight module and a display device.

BACKGROUND OF THE INVENTION

An existing backlight module generally includes a backplane, a light source (generally a LED lamp) arranged on an edge of the backplane, and a light-guiding plate arranged above the backplane, wherein the backplane and the light-guiding plate are fixed to each other by using double-sided adhesive tape at an edge of the backplane which is not provided with the LED lamp.

The inventor found that there are at least the following problems existing in the prior art: when the backlight module is subjected to Aging (High temperature and high humidity test), the adhesive of the double-sided adhesive tape will experience thermal expansion and contraction, so the light-guiding plate is pulled, which will lead to a gap between the light-guiding plate and the LED lamp at a light-incoming side of the light-guiding plate, and accordingly result in an optical defect; in addition, it is difficult to meet higher alignment requirements by manual adherence of the double-sided adhesive tape. For example, when a distance between two LED lamps is increased, and the number of the LED lamps is decreased to save the cost, if there is an alignment error in the light-guiding plate, the Hot-spot phenomenon will occur, which will result in an image defect and an optical defect.

SUMMARY OF THE INVENTION

In view of the problem in the prior art that an alignment error occurs in the light-guiding plate due to the fact that the double-sided adhesive tape is adhered to fix the backplane and the light-guiding plate, the invention provides a position-limiting structure for a backlight module, a backlight module and a display device.

Technical solutions employed to solve the problem of the invention are as follows:

A position-limiting structure for a backlight module is made of an elastic material, and is configured to be connected to a backplane; the position-limiting structure includes a position-limiting part, which is arranged outside an edge at at least one non light-incoming side of a light-guiding plate and is configured to fix the light-guiding plate to the backplane.

Preferably, the position-limiting part fixes the light-guiding plate to the backplane by inserting into an opening in the backplane.

Preferably, the position-limiting structure further includes a fixing part connected to the position-limiting part, and the fixing part is configured to be stuck at the outside of the opening in the backplane.

Preferably, the position-limiting part is vertical to the fixing part.

Preferably, the position-limiting structure is integrally formed.

Preferably, a cross section of the position-limiting structure in the direction vertical to the backplane is shaped of a "T" letter, and the horizontal part of the "T" letter is the fixing part, and the vertical part of the "T" letter is the position-limiting part.

Preferably, the position-limiting structure is made of silica gel or plastic.

The invention further provides a backlight module, including a backplane, a light-guiding plate and the above position-limiting structure.

Preferably, a bottom side of the light-guiding plate is a non light-incoming side, and the position-limiting structure fixes the light-guiding plate to the backplane at least via the bottom side.

Preferably, a left side and a right side of the light-guiding plate are non light-incoming sides, and the position-limiting structure fixes the light-guiding plate to the backplane at least via the left side and the right side.

Preferably, at least one opening is provided in the backplane at a position corresponding to the position-limiting structure, and in the direction vertical to the light-guiding plate, the position-limiting part of the position-limiting structure is inserted into the at least one opening from one side away from the light-guiding plate so as to fix the light-guiding plate to the backplane.

The invention further provides a display device, including the above backlight module.

The position-limiting structure for a backlight module of the invention is made of an elastic material, and includes the position-limiting part, which is arranged outside an edge at at least one non light-incoming side of the light-guiding plate and is configured to fix the light-guiding plate to the backplane. When the position-limiting structure is applied to a backlight module, the position-limiting part will reliably fix the light-guiding plate to the backplane and thus they are not easy to loose so that the position of the light-guiding plate can be precisely defined, and when a high temperature and high humidity test is performed, regardless heating or cooling, the position-limiting part can precisely define the position of the light-guiding plate, which will not result in an alignment error in the light-guiding plate, and accordingly will not result in the image defect, the optical defect or the like. The backlight module including the above position-limiting structure of the invention is applicable to various display devices.

Figure 1:
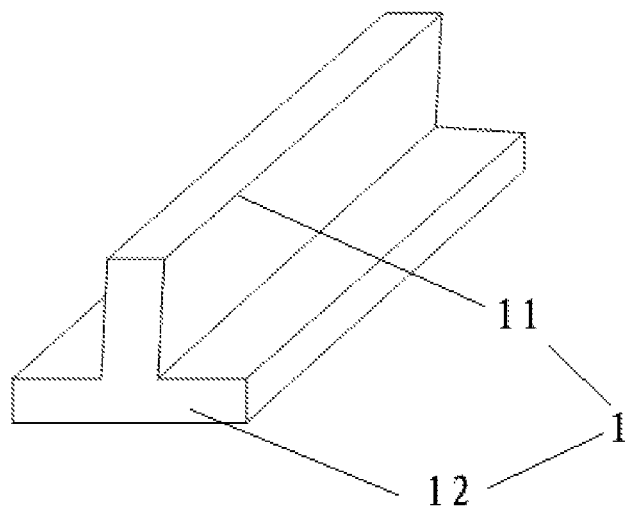
FIG. 1 is a schematic view of a position-limiting structure according to a second embodiment of the invention.

REFERENCE NUMERALS 1. position-limiting structure; 11. position-limiting part; 12. fixing part; 2. light-guiding plate; 3. backplane.

DETAILED DESCRIPTION OF THE EMBODIMENTS

To make those skilled in the art better understand the technical solutions of the present invention, the invention will be described below in detail with reference to the accompanying drawings and the following embodiments.

First Embodiment

The embodiment provides a position-limiting structure for a backlight module, and the position-limiting structure is made of an elastic material and is configured to be connected to a backplane; the position-limiting structure includes a position-limiting part, which is arranged outside an edge at at least one non light-incoming side of the light-guiding plate and is configured to fix the light-guiding plate to the backplane.

The position-limiting structure for a backlight module of the invention is made of an elastic material, and includes the position-limiting part, which is arranged outside an edge at at least one non light-incoming side of the light-guiding plate and is configured to fix the light-guiding plate to the backplane, and when the position-limiting structure is applied to a backlight module, the position-limiting part will reliably fix the light-guiding plate to the backplane and thus they are not easy to loose so that the position of the light-guiding plate can be precisely defined, which will not result in the image defect, the optical defect or the like. The backlight module including the above position-limiting structure of the invention is applicable to various display devices.

Second Embodiment

Figure 2:
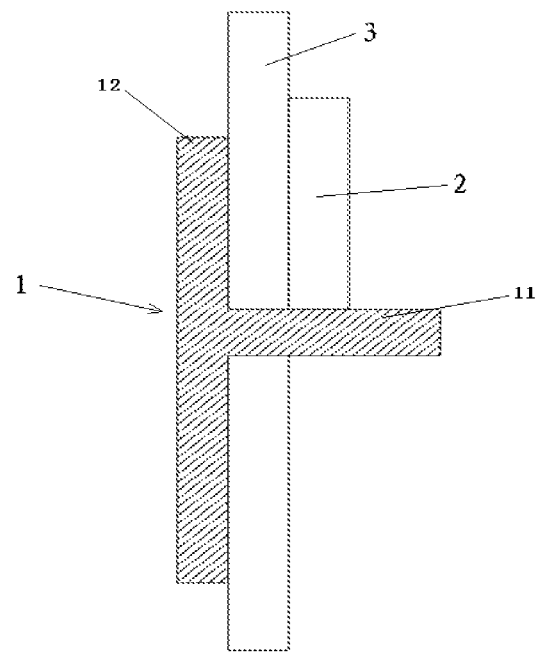
FIG. 2 is a schematic view of a backlight module according to a third embodiment of the invention.
Figure 3:
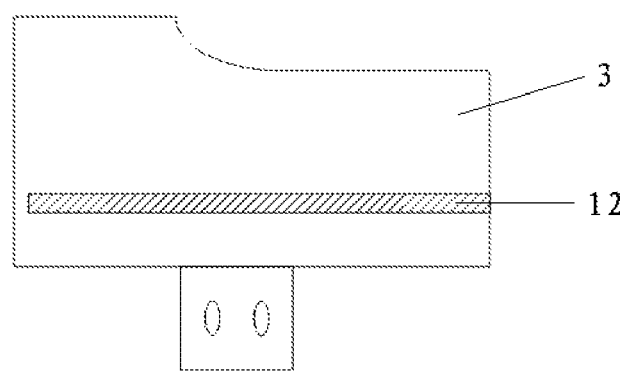
FIG. 3 is a schematic view of the backlight module according to the third embodiment of the invention.

As shown in FIGS. 1-3, the embodiment provides a position-limiting structure 1 for a backlight module, which is made of an elastic material and is configured to be connected to a backplane 3; the position-limiting structure 1 includes a position-limiting part 11, which is arranged outside an edge at at least one non light-incoming side of a light-guiding plate 2 and is configured to fix the light-guiding plate 2 to the backplane 3.

The position-limiting structure 1 of the embodiment is made of the elastic material, and includes the position-limiting part 11, which is arranged outside the edge at the at least one non light-incoming side of the light-guiding plate 2 and is configured to fix the light-guiding plate 2 to the backplane 3, and when the position-limiting structure 1 is applied to a backlight module, the position-limiting part 11 will precisely define the position of the light-guiding plate 2, and reliably fix the light-guiding plate 2 to the backplane 3 and thus they are not easy to loose so that the light-guiding plate 2 is tightly fixed to the backlight 3, and even after Aging is performed, the light-guiding plate 2 is not moved and thus the position of the light-guiding plate 2 can be precisely defined, which will not result in the image defect, the optical defect or the like. In addition, since the light-guiding plate 2 is tightly fixed, even when a distance between two LED lamps is increased, so the number of the LED lamps is decreased, the Hot-spot phenomenon will not occur, and an image defect and an optical defect will not occur. The backlight module including the above position-limiting structure of the invention is applicable to various display devices.

Preferably, as shown in FIG. 2, the position-limiting part 11 fixes the light-guiding plate 2 to the backplane 3 by inserting into an opening in the backplane 3.

That is, the opening in the backplane 3 is used to define the position of the position-limiting part 11 so as to make the light-guiding plate 2 stuck and fix the light-guiding plate 2.

Preferably, as shown in FIGS. 1-3, the position-limiting structure 1 further includes a fixing part 12 connected to the position-limiting part 11, and the fixing part 12 is configured to be stuck at the outside of the opening in the backplane 3 and cooperate with the position-limiting part 11 so as to make the light-guiding plate 2 fixed to the backplane 3.

That is, after the position-limiting part 11 is inserted into the opening in the backplane 3, the fixing part 12 will be tightly stuck at the outside of the opening in the backplane 3 so as to reliably fix the light-guiding plate 2 to the backplane 3. For example, as shown in FIG. 2, after the position-limiting part 11 is inserted into the opening in the backplane 3, the fixing part 12 will be tightly stuck at the outside of the opening in the backplane 3 so that the light-guiding plate 2 can obtain a reliable support to be fixed to the backplane reliably.

Preferably, as shown in FIG. 1, the position-limiting part 11 is vertical to the fixing part 12.

Preferably, the position-limiting structure 1 is integrally formed.

Preferably, the cross section of the position-limiting structure 1 in the direction vertical to the backplane 3 is shaped of a "T" letter, wherein the horizontal part of the "T" letter is the fixing part 12, and the vertical part of the "T" letter is the position-limiting part 11.

That is, as shown in FIG. 1, as for the "T" shaped position-limiting structure 1, the "I" shaped position-limiting part 11 is configured to be inserted into the opening in the backplane 3, and the "—" shaped fixing part 12 is stuck at the outside of the opening in the backplane 3, so that the light-guiding plate 2 is reliably fixed to the backplane 3.

Preferably, the position-limiting structure 1 is made of silica gel or plastic.

That is, the position-limiting structure 1 is made of silica gel or plastic, and in this case, when the backlight module is subjected to Aging, even the position-limiting structure 1 experiences slight deformation, an unrecoverable deformation due to the stress accumulation can be avoided after cooling.

Third Embodiment

The embodiment provides a backlight module, including a backplane 3, a light-guiding plate 2 and the position-limiting structure 1 in the second embodiment.

Preferably, as shown in FIG. 2, the bottom side of the light-guiding plate 2 is a non light-incoming side, and the position-limiting structure 1 supports the light-guiding plate 2 at least via the bottom side so that the light-guiding plate 2 is fixed to the backplane 3.

That is, the position-limiting structure 1 is in contact with the bottom side of the light-guiding plate 2, a backlight source such as a LED lamp is arranged at the top side of the light-guiding plate 2, and thus the position-limiting structure 1 can hold up the light-guiding plate 2 so as to make it fixed to the backplane 3. Alternatively, a backlight source such as a LED lamp is arranged at the top side of the light-guiding plate 2, and the position-limiting structure 1 is in contact with the left side and the right side of the light-guiding plate 2 to make the light-guiding plate 2 stuck so that the light-guiding plate 2 is fixed to the backplane 3.

Preferably, an opening is provided in the backplane 3 at a position corresponding to the position-limiting structure 1, and in the direction vertical to the light-guiding plate 2, the position-limiting part 11 of the position-limiting structure 1 is inserted into the opening from one side away from the light-guiding plate 2 to fix the light-guiding plate 2.

That is, as shown in FIG. 3, after the position-limiting structure 1 is inserted into the opening so that the light-guiding plate 2 is fixed to the backplane 3, from one side of the backplane 3 away from the light-guiding plate 2, only the fixing part 12 can be seen, and the position-limiting part 11 is inserted into the opening from outside to inside so that the light-guiding plate 2 is fixed to the backplane 3.

Obviously, various modifications may be made to the above embodiments, for example, the length of the position-limiting structure 1 in the direction parallel to the light-guiding plate 2 can be changed according to different requirements; a plurality of openings can be provided in the backplane 3 at corresponding positions, and a plurality of position-limiting structures 1 are respectively inserted into the plurality of openings so that the light-guiding plate 2 is fixed to the backplane 3.

Fourth Embodiment

The embodiment provides a display device, which includes any one of the above backlight modules. The display device may be any product or component with display function such as a liquid crystal display panel, electronic paper, a mobile phone, a tablet computer, a TV, a display, a notebook computer, a digital image frame and a navigator.

It should be understood that, the above embodiments are only exemplary embodiments used to explain the principle of the present invention and the protection scope of the present invention is not limited thereto. The person skilled in the art can make various variations and modifications without departing from the spirit and scope of the present invention, and these variations and modifications should be considered to belong to the protection scope of the invention.

The invention claimed is:

1. A position-limiting structure for a backlight module, which is made of an elastic material, and is configured to be connected to a backplane; the position-limiting structure includes a position-limiting part, which is arranged outside an edge at least one non light-incoming side of a light-guiding plate and is configured to fix the light-guiding plate to the backplane, wherein a bottom side of the light-guiding plate is a non light-incoming side and the position-limiting structure holds up and fixes the light-guiding plate to the backplane located at a left or right side of the light-guiding plate at least via the bottom side.

2. The position-limiting structure of claim 1, wherein the position-limiting part fixes the light-guiding plate to the backplane by inserting into an opening in the backplane.

3. The position-limiting structure of claim 2, wherein the position-limiting structure further includes a fixing part connected to the position-limiting part, and the fixing part is configured to be stuck at the outside of the opening in the backplane.

4. The position-limiting structure of claim 3, wherein the position-limiting part is vertical to the fixing part.

5. A backlight module, including a backplane, a light-guiding plate and the position-limiting structure according to claim 4.

6. The position-limiting structure of claim 3, wherein the position-limiting structure is integrally formed.

7. A backlight module, including a backplane, a light-guiding plate and the position-limiting structure according to claim 6.

8. The position-limiting structure of claim 3, wherein a cross section of the position-limiting structure in the direction vertical to the backplane is shaped of a "T" letter, and the horizontal part of the "T" letter is the fixing part, and the vertical part of the "T" letter is the position-limiting part.

9. A backlight module, including a backplane, a light-guiding plate and the position-limiting structure according to claim 8.

10. A backlight module, including a backplane, a light-guiding plate and the position-limiting structure according to claim 3.

11. A backlight module, including a backplane, a light-guiding plate and the position-limiting structure according to claim 2.

12. The position-limiting structure of claim 1, wherein the position-limiting structure is made of silica gel or plastic.

13. A backlight module, including a backplane, a light-guiding plate and the position-limiting structure according to claim 12.

14. A backlight module, including a backplane, a light-guiding plate and the position-limiting structure according to claim 1.

15. The backlight module of claim 14, wherein at least one opening is provided in the backplane at a position corresponding to the position-limiting structure, and in the direction vertical to the light-guiding plate, the position-limiting part of the position-limiting structure is inserted into the at least one opening from one side away from the light-guiding plate so as to fix the light-guiding plate to the backplane.

16. A display device, including the backlight module according to claim 14.

* * * * *